US008204086B2

(12) United States Patent
Luo et al.

(10) Patent No.: US 8,204,086 B2
(45) Date of Patent: Jun. 19, 2012

(54) NATURAL NETWORK CODING FOR MULTI-HOP WIRELESS NETWORK

(75) Inventors: Chong Luo, Beijing (CN); Wei Pu, Hefei (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1023 days.

(21) Appl. No.: 12/122,749

(22) Filed: May 19, 2008

(65) Prior Publication Data

US 2009/0285148 A1 Nov. 19, 2009

(51) Int. Cl.
*H04J 3/02* (2006.01)
(52) U.S. Cl. .................. 370/537; 370/319; 370/541
(58) Field of Classification Search .......... 370/319–325, 370/537–541
See application file for complete search history.

(56) References Cited

U.S. PATENT DOCUMENTS

| | | | |
|---|---|---|---|
| 7,184,703 B1 * | 2/2007 | Naden et al. ............... 455/10 |
| 7,609,652 B2 * | 10/2009 | Kellerer et al. ............ 370/252 |
| 2003/0123470 A1 * | 7/2003 | Kim et al. .................. 370/437 |
| 2004/0022214 A1 * | 2/2004 | Goren et al. ............... 370/332 |
| 2005/0111345 A1 | 5/2005 | Jacobsen et al. |
| 2006/0251062 A1 | 11/2006 | Jain et al. |
| 2006/0291440 A1 | 12/2006 | Hausl et al. |
| 2007/0149117 A1 | 6/2007 | Hwang et al. |
| 2007/0155338 A1 * | 7/2007 | Hong et al. ................. 455/69 |
| 2007/0223374 A1 * | 9/2007 | Popovski et al. ........... 370/230 |
| 2007/0274324 A1 | 11/2007 | Wu et al. |
| 2007/0280233 A1 | 12/2007 | Bush |
| 2008/0013505 A1 | 1/2008 | Trainin |
| 2008/0013642 A1 | 1/2008 | Nam et al. |

OTHER PUBLICATIONS

Wu, et al., "Information Exchange in Wireless Networks with Network Coding and Physical-layer Broadcast", 2005 Conference on Information Sciences and Systems, The Johns Hopkins University, Mar. 16-18, 2005. 6 Pages.
Zhang, et al., "Joint Design of Network Coding and Channel Decoding for Wireless Networks", WCNC 2007 proceedings. pp. 780-785.
Hausl, et al., "Joint Network-Channel Coding for the Multiple-Access Relay Channel", 3rd Annual IEEE Communications Society on Sensor and Ad Hoc Communications and Networks, 2006. SECON '06. pp. 817-822.
Fawaz, et al., "When Network Coding and Dirty Paper Coding meet in a Cooperative Ad Hoc Network", Jul. 6, 2007. 7 Pages.
Shannon, "A Mathematical Theory of Communication", Reprinted with corrections from the Bell System Technical Journal, vol. 27, pp. 379-423, 623-656, Jul., Oct. 1948.
Ho, et al., "A random linear network coding approach to multicast", IEEE Transactions on Information Theory, Publication Date: Oct. 2006. vol. 52, Issue 10. pp. 4413-4430.
Song, et al., "A Separation Theorem for Single-Source Network Coding", IEEE Transactions on Information Theory, vol. 52, No. 5, May 2006. pp. 1861-1871.
Kang, et al., "A Single-letter Upper Bound for the Sum Rate of Multiple Access Channels with Correlated Sources", Nov. 28, 2005. 5 Pages.
Erez, et al., "Achieving ½ Log (1+SNR) on the AWGN Channel With Lattice Encoding and Decoding", IEEE Transactions on Information Theory, vol. 50, No. 10, Oct. 2004. pp. 2293-2314.

(Continued)

*Primary Examiner* — Phuc Tran (57) ABSTRACT

Described herein is technology for, among other things, natural network coding in a wireless mesh network. The technology involves wireless mesh network systems, methods and devices based on the natural network coding. By encoding signals in their natural forms using their channel strengths, more efficient transmission of signals is possible in the wireless mesh network.

20 Claims, 7 Drawing Sheets

OTHER PUBLICATIONS

Koetter, et al., "An Algebraic Approach to Network Coding", IEEE/ACM Transactions on Networking, vol. 11, No. 5, Oct. 2003. pp. 782-795.

Kochman, et al., "Analog Matching of Colored Sources to Colored Channels", 2006 IEEE International Symposium on Information Theory. Jul. 2006. pp. 1539-1543.

Nazer, et al., "Computation Over Multiple-Access Channels", IEEE Transactions on Information Theory, vol. 53, No. 10, Oct. 2007. pp. 3498-3516.

Orlitsky, et al., "Coding for Computing", IEEE 1995. pp. 502-511.

Giridhar, et al., "Computing and Communicating Functions Over Sensor Networks", Jul. 30, 2004. pp. 1-10.

Nazer, et al., "Computing over Multiple-Access Channels with Connections to Wireless Network Coding", 2006 IEEE International Symposium on Information Theory, Publication Date: Jul. 2006. pp. 1354-1358.

Coso, et al., "Cooperative Distributed MIMO Channels in Wireless Sensor Networks", IEEE Journal on Selected Areas in Communications, vol. 25, No. 2, Feb. 2007. pp. 402-414.

Laneman, et al., "Cooperative Diversity in Wireless Networks: Efficient Protocols and Outage Behavior", IEEE Transactions on Information Theory, Publication Date: Dec. 2004, vol. 50, Issue: 12. pp. 3062-3080.

Zheng, et al., "Diversity and Multiplexing: A Fundamental Tradeoff in Multiple-Antenna Channels", IEEE Transactions on Information Theory, vol. 49, No. 5, May 2003. pp. 1073-1096.

Katti, et al., "Embracing Wireless Interference: Analog Network Coding", SIGCOMM'07, Aug. 27-31, 2007, Kyoto, Japan. pp. 397-408.

Feng, et al., "Functional Source Coding for Networks with Receiver Side Information", In Proceedings of the Allerton Conference on Communication, Control, and Computing, Monticello, IL, Sep. 2004. IEEE. 9 Pages.

Tse, et al., "Fundamentals of Wireless Communications", Aug. 13, 2004. 646 Pages.

Gastpar, "Uncoded transmission is exactly optimal for a simple Gaussian "sensor" network", Information Theory and Applications Workshop, 2007. Publication Date: Jan. 29-Feb. 2, 2007.pp. 177-182.

Korner, et al., "How to encode the modulo-two sum of binary sources", IEEE Transactions on Information Theory, Publication Date: Mar. 1979, vol. 25, Issue: 2. pp. 219-221.

Urbanke, et al., "Lattice Codes Can Achieve Capacity on the AWGN Channel", Sep. 11, 1997. IEEE Transactions on Information Theory. pp. 1-16.

Servetto, "Lattice Quantization with Side Information", 2007. pp. 1-10.

Erez, et al., "Lattices which are good for (Almost) Everything", ITW/2003, IEEE. pp. 271-274.

Effros, et al., "Linear Network Codes: A Unified Framework for Source, Channel, and Network Coding", DIMACS Series in Discrete Mathematics and Theoretical Computer Science. 2003. pp. 1-20.

Zhou, "Linear Network Coding", Sep. 26, 2005. 30 Pages.

Luby, "LT Codes", 2002. 10 Pages.

Bajwa, et al., "Matched Source-Channel Communication for Field Estimation in Wireless Sensor Networks", 2005, IEEE., pp. 332-339.

Cover, et al., "Multiple Access Channels with Arbitrarily Correlated Sources", IEEE Transactions on Information Theory. vol. IT-26, No. 6. Nov. 1980. pp. 648-657.

Zamir, et al., "Nested Linear/Lattice Codes for Structured Multiterminal Binning", IEEE Transactions on Information Theory, vol. 48, No. 6, Jun. 2002. pp. 1250-1276.

Ho, et al., "Network Coding from a Network Flow Perspective", IEEE International Symposium on Information Theory, 2003. Proceedings. Jun. 29-Jul. 4, 2003. pp. 1-6.

Ahlswede, et al., "Network Information Flow", IEEE Transactions on Information Theory, vol. 46, No. 4, Jul. 2000. pp. 1204-1216.

Slepian, et al., "Noiseless Coding of Correlated Information Sources", IEEE Transactions on Information Theory, vol. 19, Issue 4, Jul. 1973. pp. 471-480.

Ahlswede, et al., "On source coding with side information via a multiple-access channel and related problems in multi-user information theory", IEEE Transactions on Information Theory, Publication Date: May 1983 vol. 29, Issue 3. pp. 396-412.

Peng, et al., "On the Performance Analysis of Network-Coded Cooperation in Wireless Networks", IEEE INFOCOM 2007 proceedings. pp. 1460-1468.

Zhang, et al., "Physical-Layer Network Coding", 2006. 13 Pages.

Chou, et al., "Practical Network Coding", 2003. 10 Pages.

Nazer, et al., "Reliable Computation over Multiple-Access Channels", Proceedings of 43rd Annual Allerton Conference on Commununication, Control and Computation, Monticello, IL, Sep. 2005. 10 Pages.

Ramamoorthy, et al., "Separating Distributed Source Coding From Network Coding", IEEE Transactions on Information Theory, vol. 52, No. 6, Jun. 2006. 2785-2795.

Gastpar, et al., "Source-Channel Communication in Sensor Networks", in Proc. 2nd Intl. Workshop on Information Processing in Sensor Networks (IPSN'03), Apr. 2003, pp. 162-177.

Shamai, et al., "Systematic Lossy Source/ Channel Coding", IEEE Transactions on Information Theory, vol. 44, Issue 2, Mar. 1998 p. 564-579.

Ratnakar, et al., "The Multicast Capacity of Deterministic Relay Networks With No Interference", IEEE Transactions on Information Theory, vol. 52, No. 6, Jun. 2006. pp. 2425-2432.

Gastpar, et al., "To Code or Not to Code", Lausanne, EPFL, 2002.

Mergen, et al., "Type Based Estimation over Multiaccess Channels", Submitted to IEEE Trans. on Signal Processing, Revised in Oct. 2004 and Feb. 2005. pp. 1-13.

Gastpar, "Uncoded transmission is exactly optimal for a simple Gaussian "sensor" network", Information Theory and Applications Workshop, 2007. Publication Date: Jan. 29-Feb. 2, 2007. On pp. 177-182.

Yamamoto, et al., "Wyner-Ziv Theory for a General Function of the Correlated Sources", IEEE Transactions on Information Theory, vol. IT-28. No. 5 Sep. 1982. pp. 803-807.

* cited by examiner

NATURAL NETWORK CODING FOR MULTI-HOP WIRELESS NETWORK

BACKGROUND

A wireless mesh network is a communication network made up of radio nodes which provide two or more communication pathways per node. The wireless mesh network can provide multiple paths using the radio nodes which work as relay nodes or hops between a source and a destination. Each radio node can be a laptop, personal computer, Wi-Fi telephone, IP appliance, or any other electronic device having wireless capability. Since each node of the wireless mesh network is wirelessly connected to several other nodes, software or hardware failure to a certain node can be alleviated by a neighboring node to create an alternative route.

The wireless mesh network is often used to improve the reliability of a signal transmitted between the source and the destination by utilizing the multiple paths between them. In a traditional wireless mesh network communication protocol, an identical signal is transmitted from multiple sources using different time slots (e.g., using a time division multiplexing) to multiple destinations. Although the traditional protocol can improve the signal reliability, it consumes additional network resources, such as extra devices or components required for implementing the redundant sources and/or destinations.

Alternatively, the traditional protocol can be used to transmit different signals (e.g., data packets) from the multiple sources using the multiple paths. However, because of the possible interference between adjacent sources, different sources need to transmit their signals in a time-division way. This decreases the system throughput.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Described herein is technology for, among other things, natural network coding in a wireless mesh network. The associated natural network coding based wireless mesh network systems, methods and devices are also disclosed herein. The natural network coding enables the communication of different signals (e.g., data) between multiple sources and multiple destinations in a more efficient manner. The efficiency can be achieved by allowing multiple interfering nodes to transmit at the same time. The natural network coding makes this possible by naturally coding information bits of the different signals based on strengths of the different signals received by each relay node. Since the same channel is accessed concurrently by multiple nodes, greater throughput can be achieved with the natural network coding.

The wireless mesh network system based on the natural network coding comprises two or more sources, which generate their respective signals, and multiple relay nodes. Each of the sources encodes its respective signal using a Luby Transform (LT) coding protocol, and modulates and forwards the encoded signal. Each relay node receives respective encoded signals from the multiple sources. For example, each relay nodes may receive two encoded signals as received signals if there are two sources in the wireless mesh network. Each relay node then demodulates the received signals and encodes them into coded bits using a natural network coding protocol. The natural network coding protocol includes an air level network coding (AiNC) protocol and a logical layer Network Coding (LoNC) protocol. Especially, the AiNC protocol encodes the received signals into coded bits in their natural forms based on strengths of the received signals. Each relay node then modulates and forwards the coded bits. Once the coded bits reach a destination, they are decoded based on head information carried in data packets processed in the destination.

The techniques and tools described herein provide for efficient communication of data. Such technology is ideal for transmitting independent and separately encoded data signals using multi-hop relays available in the wireless mesh network. Since the natural network coding does not require time division multiplexing among multiple sources of the wireless mesh network, a higher throughput can be achieved for signal transmission.

BRIEF DESCRIPTION OF THE DRAWINGS

The accompanying drawings, which are incorporated in and form a part of this specification, illustrate embodiments and, together with the description, serve to explain their principles.

Other features of the present embodiments will be apparent from the accompanying drawings and from the detailed description that follows.

DETAILED DESCRIPTION

Reference will now be made in detail to the embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining," "outputting," "transmitting," "recording," "locating," "storing," "displaying," "receiving," "recognizing," "utilizing," "generating," "providing," "accessing," "checking," "notifying," "delivering," or the like, refer to the actions and processes of a computer system, or similar electronic computing devices that manipulate and transform data. The data is represented as physical (electronic) quantities within the computer system's registers and memories and is transformed into other data similarly represented as physical quantities within the computer system memories, registers, or other such information storage, transmission, or display devices.

Described herein is technology for, among other things, natural network coding in a wireless mesh network. The natural network coding enables the communication of different signals (e.g., data) between multiple sources and multiple destinations in a more efficient manner. The efficiency can be achieved by allowing interfering nodes access the wireless medium simultaneously. The natural network coding makes this possible by naturally coding information bits of the different signals based on strengths of the different signals received by each relay node.

Figure 1:
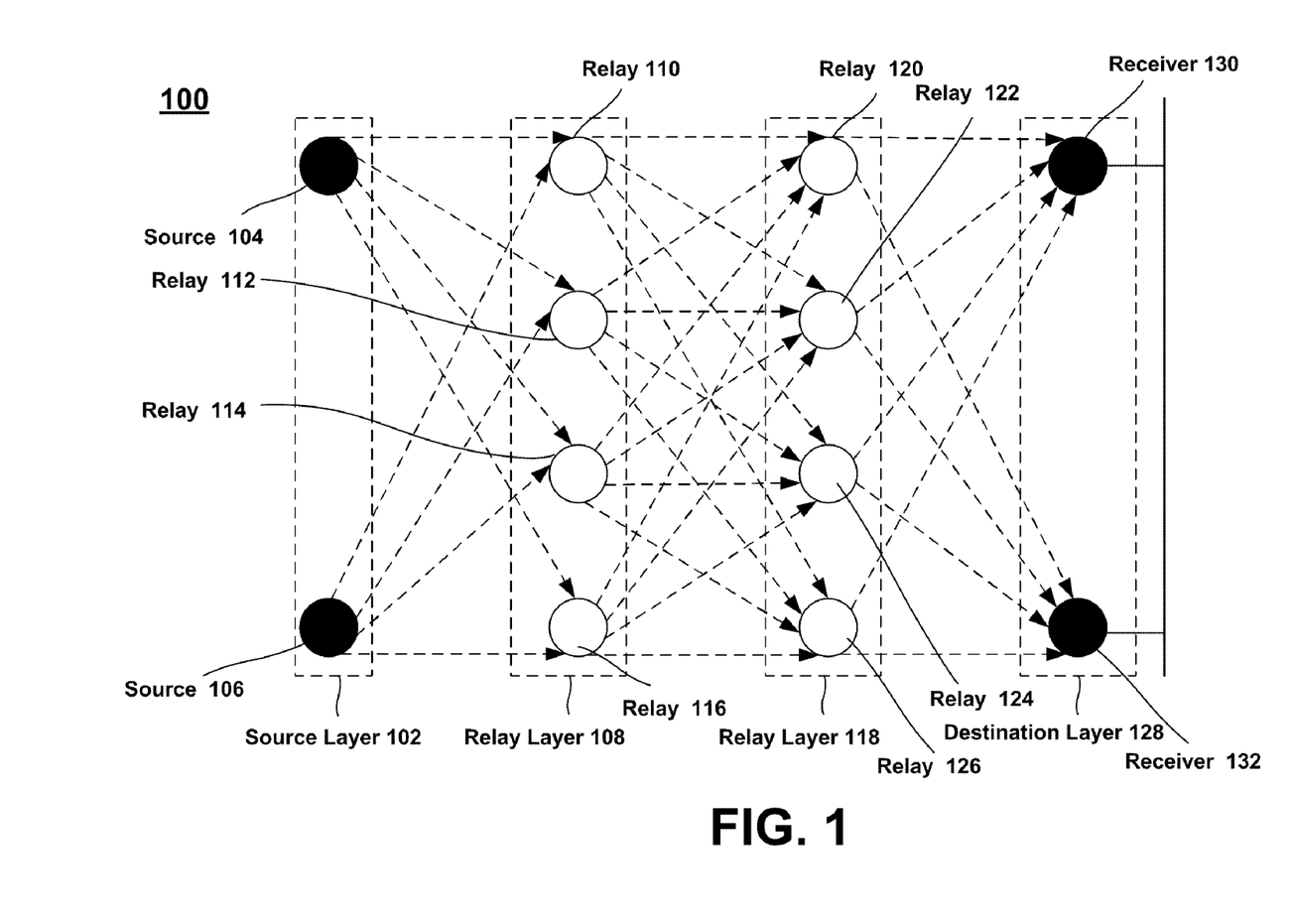
FIG. 1 is a network diagram of an exemplary wireless mesh network based on a natural network coding protocol for implementing embodiments.

FIG. 1 is a network diagram of an exemplary wireless mesh network 100 based on a natural network coding protocol, according to one embodiment. With reference to FIG. 1, the wireless mesh network 100 includes a source layer 102, a relay layer 108, a relay layer 118 and a destination layer 128. The source layer 102 comprises two or more sources or signal sources, such as a source 104 and a source 106. The source 104 and the source 106 transmit their respective signals (e.g., two different data). The relay layer 108 comprises one or more relays, such as a relay 110, a relay 112, a relay 114 and a relay 116. Each relay directly maps the signals received from the sources into coded bits based on strengths of the received signals, as will be illustrated in detail in FIG. 3A through 3C. Each relay then processes and forwards the coded bits.

The destination layer 128 comprises one or more receivers, such as a receiver 130 and a receiver 132, which decodes the coded bits. The receiver (e.g., 130, 132, etc.) can be either a single base station with multiple receiver antennas or a group of single antenna nodes connected with high-speed wired network. Strengths of the signals or the channel strengths are measured by transmitting respective test bits from the sources (e.g., 104, 106, etc.) to each relay (e.g., 110, 112, 114 or 116) and measuring the strengths of the test bits received by the same relay. The sources can be a laptop, the relays can be a laptop or a router, and the receivers can be an access point. It is appreciated that the wireless mesh network 100 can comprise more than one relay layer as illustrated in FIG. 1, which has the relay layer 108 and the relay layer 118.

Figure 2A:
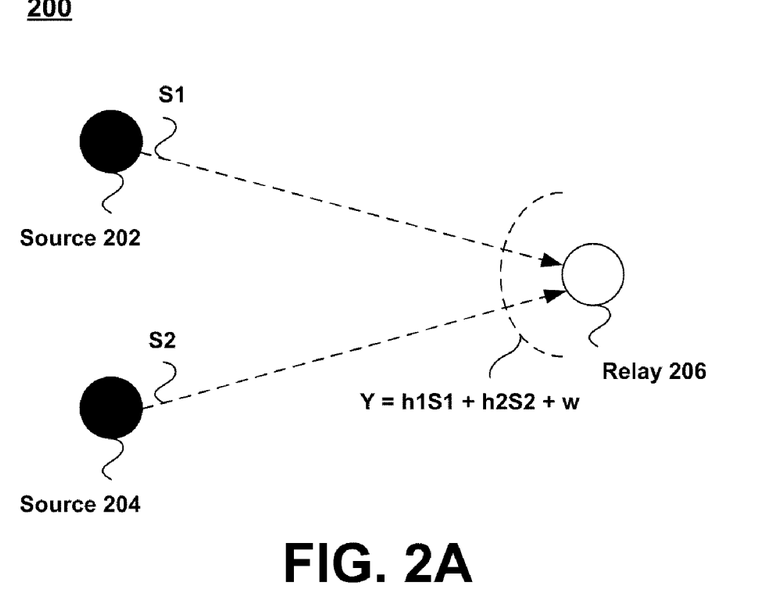
FIG. 2A is a diagram illustrating the nature of signals transmitted from two or more sources and received by a relay node of the wireless mesh network of FIG. 1, in accordance with an embodiment.

FIG. 2A is a diagram 200 illustrating the nature of signals transmitted from two or more sources (e.g., 202 and 204) and received by a relay node 206, in accordance with an embodiment. It is appreciated that the two signal sources and the relay node 206 are exemplary embodiments of the wireless mesh network 100 in FIG. 1. It is also appreciated that channels in the wireless mesh network 100 are flat fading and/or slow block fading channels, and that perfect synchronization and channel side information at the relay node 206 are assumed. It is also appreciated that data communicated through the channels are modulated using a binary phase shift keying (BPSK) protocol. In FIG. 2A, a source 202 and a source 204 are simultaneously transmitting signals S1 and S2, respectively, to the relay node 206. Then, Y (e.g., the signals received at the relay node 206) is the sum of S1 faded by fading factor h1 and S2 faded by fading factor h2 plus white noise. Thus, Y=h1S1+h2S2+w.

In traditional network coding, a source 202 and a source 204 need to transmit signals S1 and S2 in different time slots. Then, the relay node 206, after detecting S1 and S2 to obtain their corresponding information bits (e.g., 0 or 1), randomly generates network coding coefficients C1 and C2, and performs a linear network coding over GF(2), where GF stands for Gallois Field, to generate coded bits. Thus, $$Y = C1X1 \oplus C2X2 \quad (1)$$

where Ci and Xi is 0 or 1. In Air level Network Coding (AiNC) protocol, which is the basis for the natural network coding protocol, S1 and S2 are directly mapped to the coded bit Y by choosing C1 and C2 according to the channel status (e.g., or h1 and h2 in this case). In one exemplary implementation, h1 or h2 is close to 0 if its respective channel strength is weak. On the other hand, h1 or h2 is close to 1 if its respective channel strength is strong.

Figure 2B:
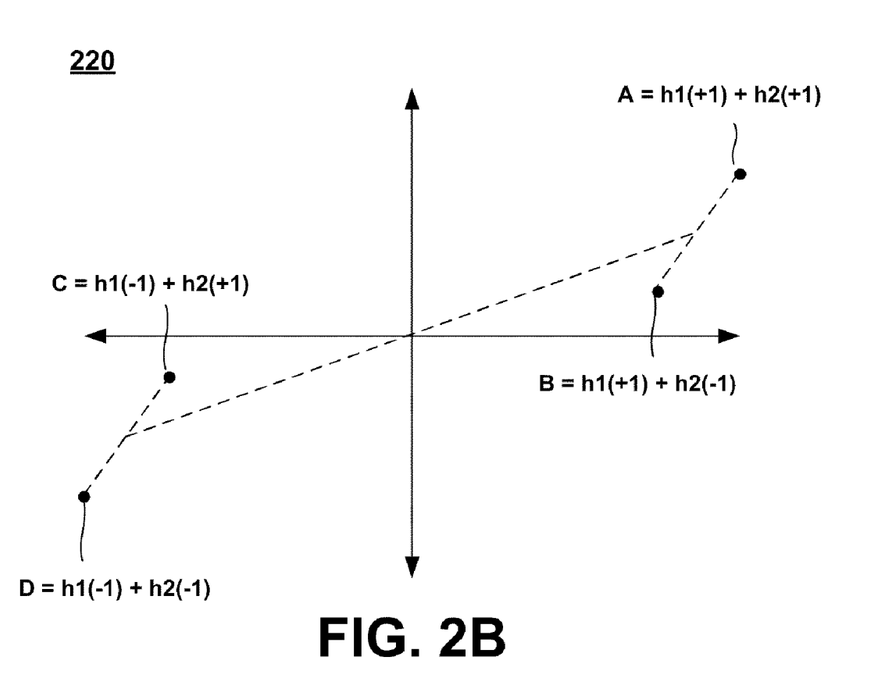
FIGS. 2B, 2C and 2D are graphs illustrating possible constellations for signals received at the relay node of FIG. 2A, in accordance with an embodiment.
Figure 2C:
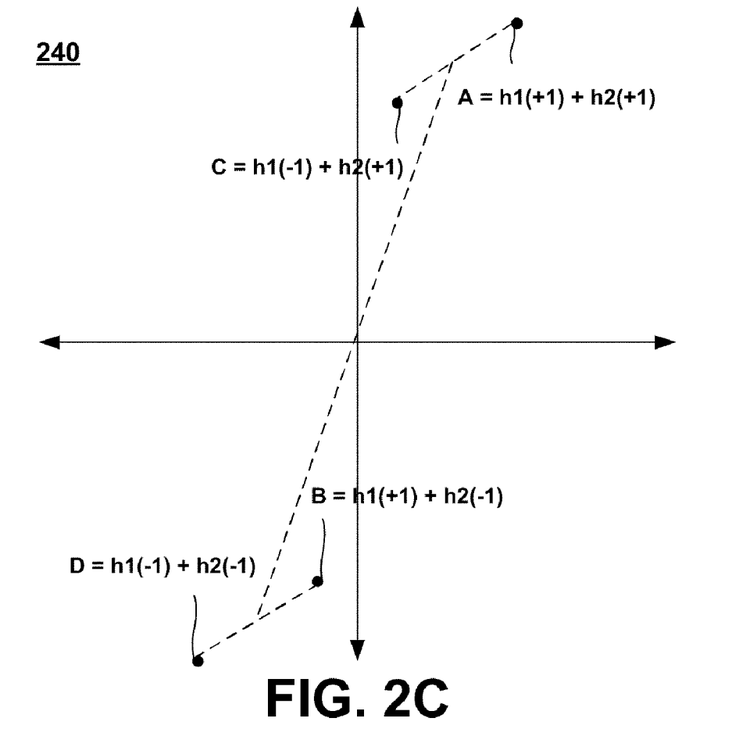
Figure 2D:
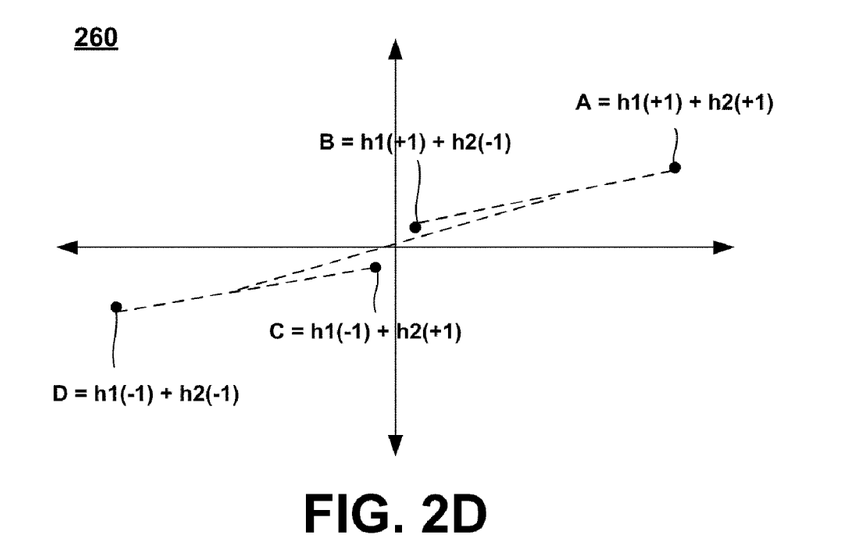

FIGS. 2B, 2C and 2D are graphs illustrating possible constellations for signals received at the relay node 206 of FIG. 2A, in accordance with an embodiment. FIG. 2B illustrates the case where S1 is strong but S2 is weak. In other words, the value for fading factor h1 is close to 1, whereas the value for fading factor h2 is close to 0. Given that there are four possibilities with the corresponding bits of S1 and S2 and assuming that bit '0' is mapped to +1 and bit '1' is mapped to −1 in the BPSK modulation, nodes A, B, C and D represent four cases where {S1, S2}={+1, +1}, {+1, −1}, {−1, +1} and {−1, −1}, respectively.

In FIG. 2B, the detection error mainly comes from confusing nodes A and B or C and D. If C1=1 and C2=0 were chosen for this channel status (e.g., where h1 is close to 1 and h2 is close to 0), the corresponding information bits X1 and X2 for A are 0 and 0. Thus, $Y_A = 1*(0)$ XOR $0*(0) = 0$. The coded bit for A becomes 0. Likewise, $Y_B = 0$, $Y_C = 1$, and $Y_D = 1$. Since nodes A and B (or C and D) have the same coded value, they do not need to be differentiated. That is, when performing signal detection, it needs to determine whether the received signal belongs to the set {A, B} or {C, D} since the two nodes in each set have the same coded value. In one embodiment, the minimum distance for joint signal detection and network coding becomes |BC|, which is much larger than |AB| or |CD|, which is the minimum distance for signal detection according to the traditional coding protocol.

FIG. 2C illustrates the case where S1 is weak but S2 is strong. In other words, the value for fading factor h1 is close to 0, whereas the value for fading factor h2 is close to 1. Given that there are four possibilities with the corresponding bits of S1 and S2 and assuming that bit '0' is mapped to +1 and bit '1' is mapped to −1 in the BPSK modulation, nodes A, B, C and D represent four cases where {S1, S2}={+1, +1}, {+1, −1}, {−1, +1} and {−1, −1}, respectively.

In FIG. 2C, the detection error mainly comes from confusing nodes A and C or B and D. If C1=0 and C2=1 were chosen for this channel status (e.g., where h1 is close to 0 and h2 is close to 1), the corresponding information bits X1 and X2 for A are 0 and 0. Thus, $Y_A$=0*(0) XOR 1*(0)=0. The coded bit for A becomes 0. Likewise, $Y_B$=1, $Y_C$=0, and $Y_D$=1. Since nodes A and C (or nodes B and D) have the same coded value, they do not need to be differentiated. That is, when performing signal detection, it needs to determine whether the received signal belongs to set {A, C} or {B, D} since the two nodes in each set have the same coded value. In one embodiment, the minimum distance for joint signal detection and network coding becomes |BC|, which is much larger than |AC| or |BD|, the minimum distance for signal detection according to the traditional coding protocol.

FIG. 2D illustrates the case where both S1 and S2 are strong. In other words, both the values for fading factors h1 and h2 are close to 1. Given that there are four possibilities with the corresponding bits of S1 and S2 and assuming that bit '0' is mapped to +1 and bit '1' is mapped to −1 in the BPSK modulation, nodes A, B, C and D represent four cases where {S1, S2}={+1, +1}, {+1, −1}, {−1, +1} and {−1, −1}.

In FIG. 2D, the detection error mainly comes from confusing nodes B and C. If C1=1 and C2=1 were chosen for this channel status (e.g., where both h1 and h2 are close to 1), the corresponding information bits X1 and X2 for A are 0 and 0. Thus, $Y_A$=1*(0) XOR 1*(0)=0. The coded bit for A becomes 0. Likewise, $Y_B$=1, $Y_C$=1, and $Y_D$=0. Since nodes A and D (or nodes B and C) have the same coded value, they do not need to be differentiated. That is, when performing signal detection, it needs to determine whether the received signal belongs to set {A, D} or {B, C} since the two nodes in each set have the same coded value. In one embodiment, the minimum distance for joint signal detection and network coding becomes |AB|, which is much larger than |BC|, the minimum distance for signal detection according to the traditional coding protocol.

In one embodiment, there are multiple relays (e.g., a relay layer) which detect and code received signals from two or more sources. The combined signals from the two or more sources may reach each of the multiple relays under different channel strengths. For instance, if relay 1 in the relay layer is close to source 1 but is far from source 2, relay 1 may have a constellation similar to what is illustrated in FIG. 2B. If relay 2 in the relay layer is close to source 2 but is far from source 1, relay 2 may have a constellation similar to what is illustrated in FIG. 2C. If relay 3 is close to both source 1 and source 2, relay 3 may have a constellation similar to what is illustrated in FIG. 2D.

Therefore, when there are a large number of relays, with each relay observing a different channel status, simultaneously detecting and encoding of signals from signal sources can be successfully performed with high probability if the AiNC encoding vectors are randomly chosen.

Figure 3:
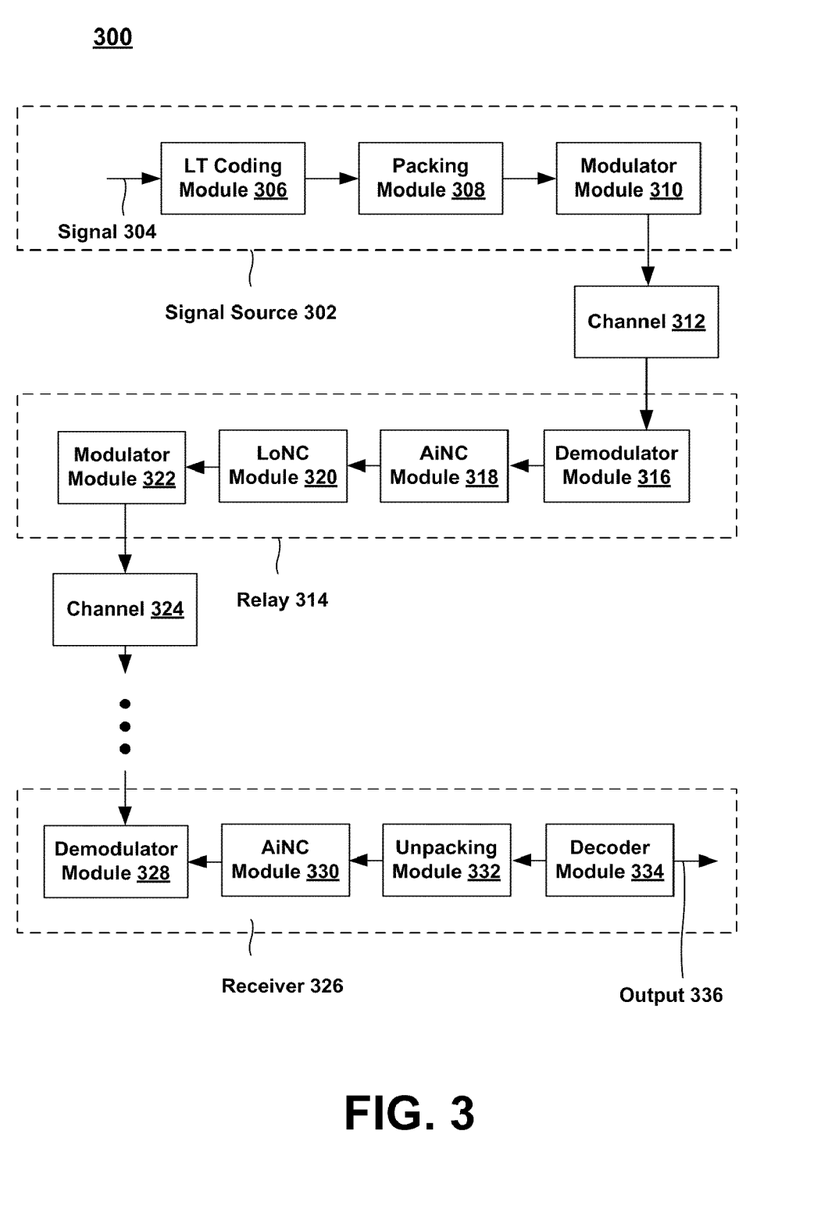
FIG. 3 is a block diagram of an exemplary wireless mesh network system based on the natural network coding protocol for implementing embodiments.

FIG. 3 is a block diagram of an exemplary wireless mesh network system 300 based on the natural network coding protocol for implementing embodiments. It is appreciated that the wireless mesh network system 300 is an exemplary embodiment of the wireless mesh network system 100 of FIG. 1. As illustrated in FIG. 3, the wireless mesh network system 300 comprises a source 302, a relay 314 and a receiver 326.

The source 302 comprises a Luby Transform (LT) coding module 306 which extends a bit stream of a signal 304. The source 302 further comprises a packing module 308 which compresses the signal, and a modulator module 310 which modulates the signal for transmission via a channel 312. It is appreciated that to perform LT coding, the signal 304 is first partitioned into fixed size blocks called LT blocks, where the LT coding is performed applying exclusive OR (XOR) to selected LT blocks following predefined selection criteria. It is also appreciated that the signal 304 processed by the LT coding can be decoded with a higher probability of success since it is more immune to packet loss and decoding matrix's singularity. In one exemplary implementation, the modulator module 310 performs a binary phase shift keying (BPSK) modulation. It is appreciated that the source 302 is an exemplary embodiment of the source (e.g., 104, 106, etc.) of FIG. 1.

A relay 314 comprises a demodulator module 316 which demodulates signals received at the relay 314 (e.g., which includes the signal 304 and one or more signals from other signal sources). The relay 314 also comprises an air level network coding (AiNC) module 318 which directly maps the signals using AiNC protocol. Moreover, the relay 314 comprises a logical level network coding (LoNC) module 320 which multiplies the signals treated with the AiNC protocol with a randomly chosen coefficient in Galois Field ($2^m$) to generate coded bits. The relay 314 further comprises a modulator module 322 which modulates the coded bits to transmit via a channel 324. It is appreciated that there could be more than one layer of relays with each relay having the same set of modules that can process the received signals as described above.

At each relay node j, received signals can be expressed as:

$$Y_j[m] = \sum_{i=1}^{N_t} h_{i,j}[m]S_i[m] + w_j[m] \quad (2)$$

where $S_i[m]$ is the BPSK modulated signal from a source node i. Its corresponding information bit is $X_i[m]$. $h_{i,j}$ is channel fading parameter between source node i and relay node j. $w_j[m]$ is an active white Gaussian noise. $N_t$ is a transmitter number. As FIG. 2A illustrates, AiNC network encoding vector is determined by channel fading parameters. The optimal network encoding vector C (e.g., where C=(C1, C2, ... CNt) and $C_i$ is an element of GF(2)) that can provide the largest joint signal detection and network coding distance in the relay's constellation can be found by combining constellation points having the same network coded value, which is Z in equation (3) below:

$$Z = \bigoplus_{i=1}^{N_t} C_i X_i[m] \quad (3)$$

The AiNC protocol can be used to classify these constellation points or nodes into two classes using equation (3) so that the minimum distance between the two classes can be maximized. It is appreciated that although complexity of the protocol can grow exponentially with a high transmitter number, the complexity can be reduced by judiciously utilizing symmetry of the points. Once the optimal AiNC encoding vector is obtained, the AiNC encoding is performed symbol by symbol.

The LoNC module 320 is used to rectify a case where field size of the AiNC protocol is restricted due to the BPSK modulation. The restriction may cause some difficulties in conveying useful information. In one exemplary implementation, the LoNC module 320 multiplies the AiNC coded packet (e.g., which is the output of the AiNC module 318) with a randomly chosen coefficient in $GF(2^m)$. By introducing the LoNC protocol, the encoding vector becomes:

$$\left(1 \cdot \begin{pmatrix} 0 \\ d_1 \end{pmatrix} + 1 \cdot \begin{pmatrix} d_2 \\ 0 \end{pmatrix} + 1 \cdot \begin{pmatrix} d_3 \\ d_3 \end{pmatrix} + 0 \cdot \begin{pmatrix} 0 \\ d_4 \end{pmatrix}\right) = \begin{pmatrix} d_5(d_2 + d_3) \\ d_5(d_1 + d_3) \end{pmatrix} \quad (4)$$

where the AiNC encoding vectors are (0, 1), (1,0), (1, 1) and (0, 1) for the first hop (e.g., the first relay layer 108 of FIG. 1) of the wireless mesh network 100, (1, 1, 1, 0) for the second hop, and LoNC coefficients of the relays are d1, d2, d3, and d4 for the first hop and d5 at the second hop.

The receiver 326 comprises a demodulator module 328 for demodulating received signals by the receiver 326, an AiNC module 330 for encoding the received signal using the AiNC protocol, an unpacking module 332 for unpacking the received signals, and a decoder module 334 for decoding the received signals. The decoder module 334 further comprises a network decoder module for decoding the received signals previously treated with the AiNC modules (e.g., 318, 330, etc.) and the LoNC modules (e.g., 320, etc.). The decoder module 334 further comprises a LT decoder module which decodes the received signals previously treated with the LT coding module 306.

The receiver 326 first performs the AiNC protocol to detect the received signals, where encoding operation of both the network coding (e.g., the AiNC and the LoNC) and the LT coding are linear combination over finite field. The difference is that the LT coding combines LT-blocks from only one source over GF(2), whereas the network coding combines LT-blocks from different sources over $GF(2^m)$. The network coding and the LT coding can be expressed in a unified expression of equation (5), $$Ci = \sum_{K=1}^{N_s} (X_k d_{k,i}) c_{k,i} = \sum_{K=1}^{N_s} X_k (d_{k,i} c_{k,i}) = [X_1 \ldots X_{Ns}] \cdot \begin{bmatrix} C_{1,i} d_{1,i} \\ \vdots \\ C_{Ns,i} d_{Ns,i} \end{bmatrix} \quad (5)$$

where Ci is the received packet at the receiver 326 after being processed by the AiNC module 330. $X_k = [x_1^k \ldots x_{NLT}^k]$ is $N \times N_{LT}$ matrix, where N is the length of a LT-block, $x_j^k$ represents the $j^{th}$ LT-block from the $k^{th}$ source. $d_{k,i}$ is 0-1 vector that indicates the position of the selected blocks from the $k^{th}$ source. $X_k d_{k,i}$ is the $i^{th}$ LT coded block from the $k^{th}$ source. $C_{k,i}$ is the network coding vector observed at the receiver. From equation (5), it can be seen that the received packet is just a random linear combination of LT-blocks from different sources. The decoding problem is reduced to solving a linear problem with coefficients from $GF(2^m)$. Similar to the LT decoder, the message-passing algorithm can be used to decode source information.

Figure 4:
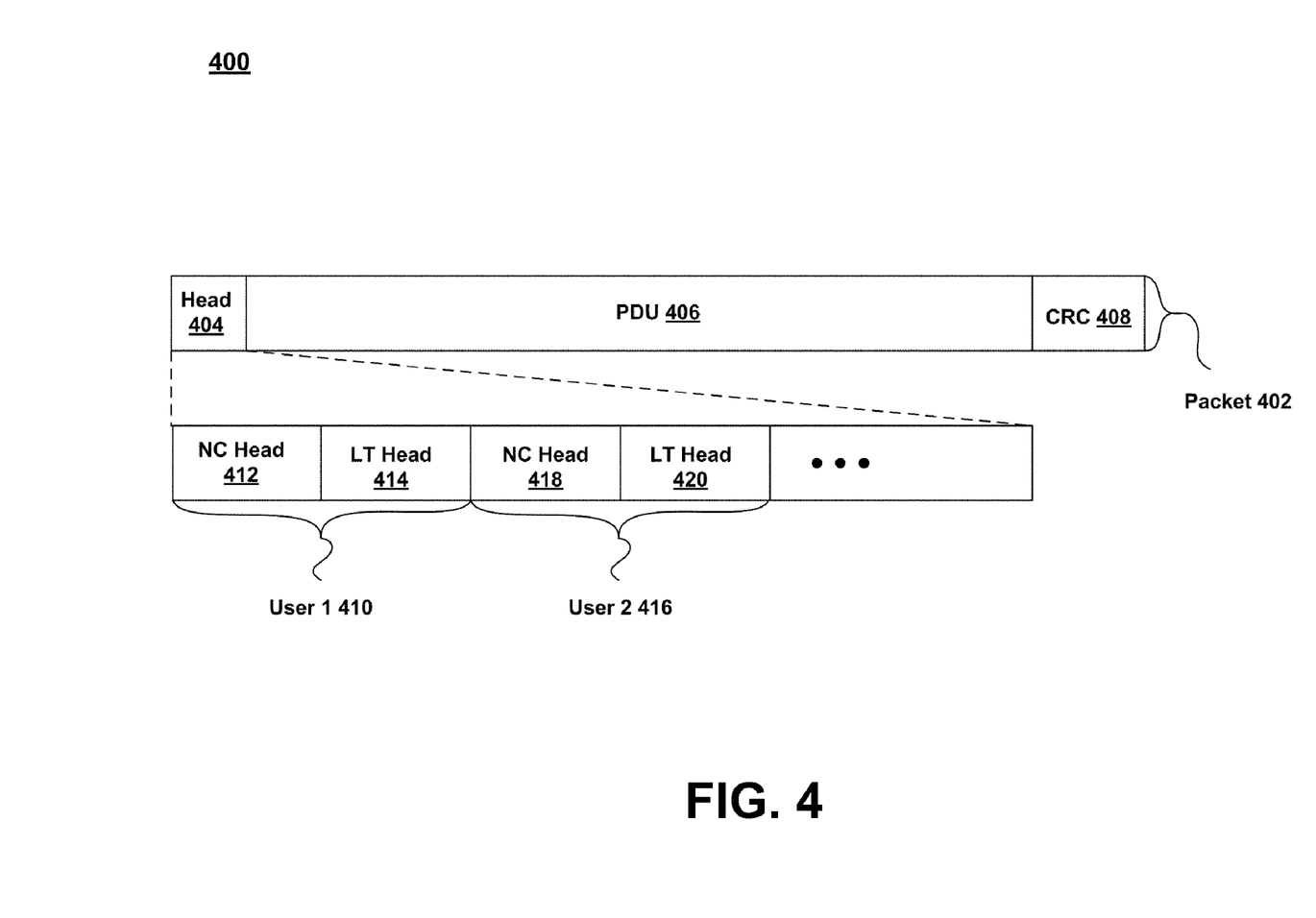
FIG. 4 is a block diagram of an exemplary packet head for data communicated through the wireless mesh network of FIG. 1, in accordance with an embodiment.

FIG. 4 is a block diagram of an exemplary packet head 404 for data communicated through the wireless mesh network of FIG. 1, in accordance with an embodiment. The decoder module 334 in FIG. 3 performs decoding of the received signals by using information carried in the head 404 of a received packet 402. As illustrated in FIG. 4, the packet 402 includes the head 404, a packet data unit (PDU) 406, and a cyclic redundancy check (CRC) 408. In one embodiment, the head 404 comprises NC heads and LT heads for different users/signal sources (e.g., a NC head 412 and a LT head 414 for user 1 410, a NC head 418 and a LT head 420 for user 2 416, etc.).

It is appreciated that necessary information for decoding operation in the receiver 326 (e.g., the decoder module 334) in FIG. 3 includes the network encoding vector and the LT coding parameters embedded in the NC heads and the LT heads. In one exemplary implementation, the information is stored orthogonally among the users to guarantee that the receiver 326 can obtain it for decoding. In one exemplary implementation, head positions for unused users (e.g., the user 2 416, etc.) are reserved and filled with 0. There are two fields for each user's head information. The first is the NC head, which contains network coding coefficients. The length of this field is determined by the field size of LoNC, i.e., it requires m bits if we use $GF(2^m)$ for LoNC. At the source 302, this field is filled with:

$$\underbrace{00 \ldots 01}_{m \text{ bits}}$$

which can be viewed as 1 in $GF(2^m)$. The second field is the LT head which contains necessary information for LT decoding. The head information is updated hop by hop (e.g. relay layer by relay layer) to store network encoding vector. At the end of the packet 402, the CRC 408 (e.g., 16 bits) is appended to check the data integrity.

Figure 5:
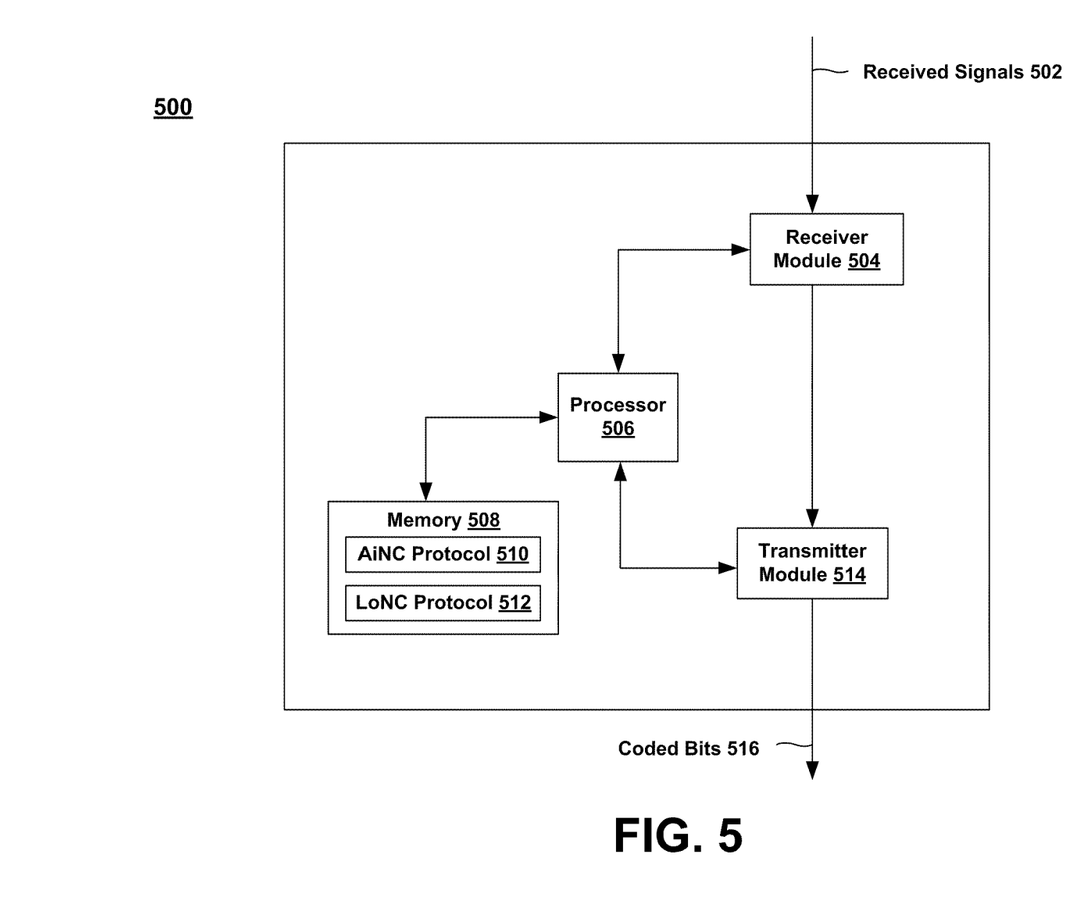
FIG. 5 is a flowchart of an exemplary process for naturally coding and forwarding signals from two or more sources, in accordance with an embodiment.

FIG. 5 is a block diagram of an exemplary relay device 500 implemented in the wireless mesh network system 100 of FIG. 1, in accordance with one embodiment. The delay device 500 includes a receiver module 504, a processor 506, a memory 508, and a transmitter module 514. The receiver module 504 receives and processes (e.g., demodulates) respective signals from two or more signal sources.

The memory comprises a set of instructions for a coding protocol (e.g., an AiNC protocol 510), when executed by the processor 506, executes a method which determines strengths of respective signals from the signal sources and directly encodes the signals into a coded signal based on the strengths of the signals, where the signals from the signal sources are processed in their natural forms for the encoding. The strengths of the respective signals can be obtained by measuring signal strengths of test bits transmitted from the signal sources. In addition, a weak signal or weak signals (e.g., having a signal strength less than a threshold signal strength) among the respective signals are ignored in the coding process. Moreover, the coded signal comprises information used for decoding of the coded signal at a destination device (e.g., access point).

The memory further comprises a logical level network coding (LoNC) protocol 512 for multiplying the coded bits with a randomly chosen coefficient in Galois Field ($2^m$). The transmitter module 514 then processes (e.g., modulates) and transmits the coded bits. Thus, embodiments provide technology for natural network coding of signals communicated in a wireless mesh network.

Figure 6:
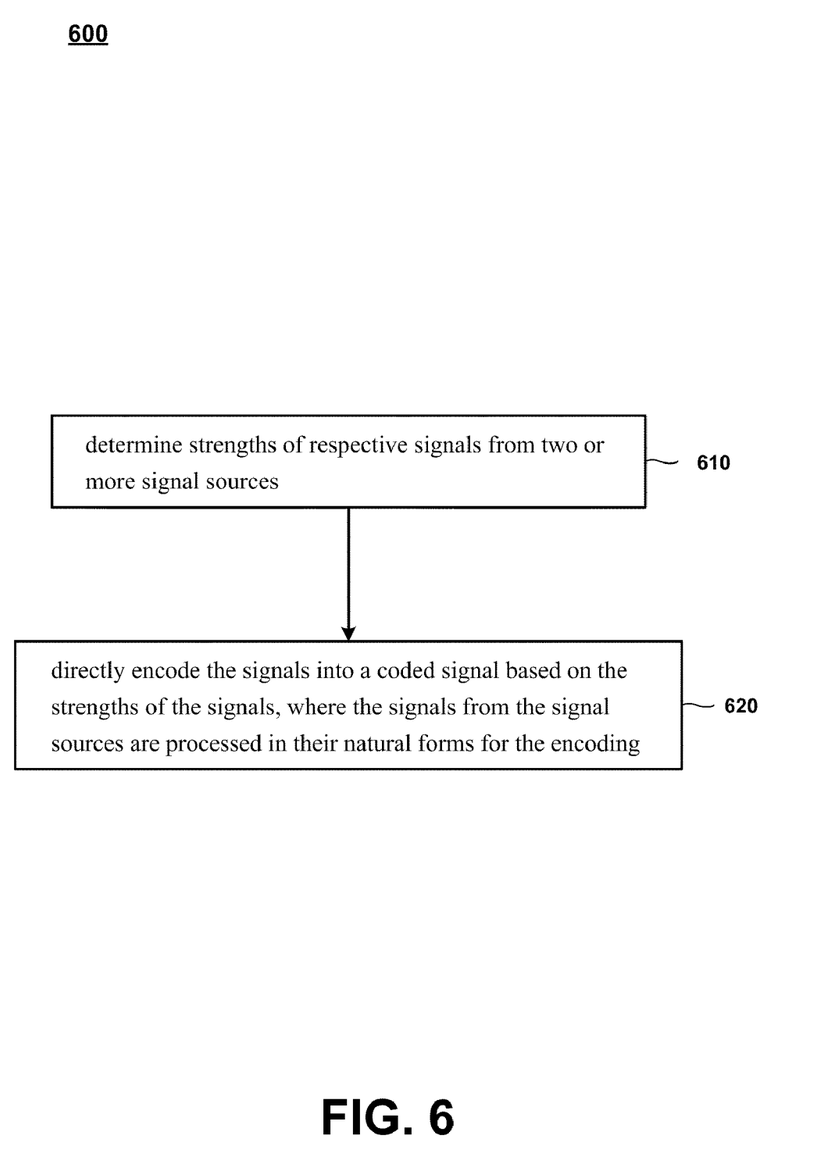
FIG. 6 is a block diagram of an exemplary relay device implemented in the wireless mesh network system of FIG. 1, in accordance with one embodiment.

FIG. 6 is a flowchart of an exemplary process for naturally coding and forwarding signals from two or more signal sources, in accordance with an embodiment. It is appreciated that additional steps may also be included in process 600 in accordance with alternative embodiments. In operation 610, strengths of respective signals from two or more signal sources in a wireless mesh network are determined at a relay node of the wireless mesh network. In operation 620, the signals are directly encoded into coded bits based on the strengths of the signals, where the signals from the signal sources are processed in their natural forms for the encoding.

In one exemplary implementation, a wireless mesh network comprises a relay which forwards two different signals from two signal sources to their respective destinations based on a natural network coding protocol. The protocol comprises determining strength of a first signal from a first signal source and strength of a second signal from a second signal source. The protocol further comprises directly encoding the first signal and the second signal into a coded signal based on the strength of the first signal and the strength of the second signal.

The strength of the first signal and the strength of the second signal are determined by measuring respective signal strengths of test bits transmitted from the first signal source and the second signal source and received by the relay. The first signal is ignored in the encoding of the first signal and the second signal into the coded signal if the strength of the first signal is less than the threshold signal strength. The second signal is ignored in the encoding of the first signal and the second signal into the coded signal if the strength of the second signal is less than the threshold signal strength.

The first signal and the second signal are modulated based on a binary phase shift keying (BPSK) protocol. The first signal and the second signal are demodulated in the relay before the coding process takes place. The coded signal is transmitted to the receiver of a destination device. The receiver may comprise a decoder module for decoding the coded signal. The decoder module may decode the coded signal based on information carried in the head of the coded signal.

The techniques and tools described herein provide for efficient communication of data. Such technology is ideal for transmitting independent and separately encoded data signals using the multi-hop relays available in the wireless mesh network. Since the natural network coding does not require time division multiplexing among multiple sources of the wireless mesh network, a higher throughput can be achieved for signal transmission.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for natural network coding at a relay of a wireless mesh network having two signal sources, comprising:
    determining a strength of a first signal from a first signal source and a strength of a second signal from a second signal source; and
    encoding the first signal and the second signal into a coded signal based on the strength of the first signal and the strength of the second signal.

2. The method as recited in claim 1, wherein the determining of the strength of the first signal and the strength of the second signal is performed by measuring respective signal strengths of test bits transmitted from the first signal source and the second signal source and received by the relay.

3. The method as recited in claim 1, wherein the first signal is ignored in the encoding of the first signal and the second signal into the coded signal if the strength of the first signal is less than a threshold signal strength.

4. The method as recited in claim 1, wherein the second signal is ignored in the encoding of the first signal and the second signal into the coded signal if the strength of the second signal is less than a threshold signal strength.

5. The method as recited in claim 1, wherein the first signal is modulated in the first signal source based on a binary phase shift keying (BPSK) protocol.

6. The method as recited in claim 5, wherein the second signal is modulated in the second signal source based on the BPSK protocol.

7. The method as recited in claim 6, wherein the first signal and the second signal are demodulated in the relay.

8. The method as recited in claim 7, further comprising transmitting the coded signal to a receiver.

9. The method as recited in claim 8, wherein the receiver comprises a decoder module for decoding the coded signal.

10. The method as recited in claim 9, wherein the decoder module performs the decoding of the coded signal based on information carried in a head of the coded signal.

11. A method for natural network coding at a relay of a wireless mesh network having at least two signal sources, comprising: determining strengths of respective signals from the at least two signal sources; and directly encoding the signals into a coded signal based on the strengths of the signals, wherein the signals from the at least two signal sources are processed in their natural forms for the encoding.

12. The method as recited in claim 11, wherein the determining the strengths of the respective signals is performed by measuring strengths of test bits transmitted from the at least two signal sources and received at the relay.

13. The method as recited in claim 12, wherein each one of the respective signals is ignored in the encoding of the signals into the coded signal if a strength of the each one of the respective signals is less than a threshold signal strength.

14. The method as recited in claim 11, further comprising transmitting the coded signal to a receiver.

15. The method as recited in claim 14, wherein the receiver comprises a decoder module for decoding the coded signal.

16. The method as recited in claim 15, wherein information associated with the decoding of the coded signal is carried in a head of the coded signal.

17. A relay device for natural network coding, comprising:
    a receiver module for receiving respective signals from at least two signal sources;
    a memory comprising a set of instructions for coding protocol;
    a processor configured to execute the set of instructions to determine strengths of respective signals from the at least two signal sources and configured to execute the set of instructions to directly encode the signals into a coded signal based on the strengths of the signals, wherein the signals from the at least two signal sources are processed in their natural forms for the encoding; and a transmitter module for transmitting the coded signal.

18. The device as recited in claim 17, wherein the processor is configured to determine the strengths of the respective signals is performed by measuring strengths of test bits transmitted from the at least two signal sources.

19. The device as recited in claim 17, wherein each one of the respective signals is ignored in the encoding of the signals into the coded signal if a strength of the each one of the respective signals is less than a threshold signal strength.

20. The device as recited in claim 17, wherein the coded signal comprises information used for decoding of the coded signal at a destination device of the coded signal.

* * * * *